(12) United States Patent
Ren et al.

(10) Patent No.: US 12,494,470 B2
(45) Date of Patent: Dec. 9, 2025

(54) METHOD FOR COATING A METAL LAYER SUCH AS LITHIUM METAL ON A WEB SUCH AS A CURRENT COLLECTOR FOIL

(71) Applicant: GM GLOBAL TECHNOLOGY OPERATIONS LLC, Detroit, MI (US)

(72) Inventors: Yaoyu Ren, Beijing (CN); Ming Wang, Sterling Heights, MI (US); Shaomao Xu, Sterling Heights, MI (US); Ryan Curtis Sekol, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 587 days.

(21) Appl. No.: 17/970,659

(22) Filed: Oct. 21, 2022

(65) Prior Publication Data

US 2024/0136493 A1   Apr. 25, 2024
US 2024/0234673 A9   Jul. 11, 2024

(51) Int. Cl.
*H01M 4/04*   (2006.01)
*H01M 4/38*   (2006.01)
*H01M 4/66*   (2006.01)

(52) U.S. Cl.
CPC ......... *H01M 4/0404* (2013.01); *H01M 4/382* (2013.01); *H01M 4/661* (2013.01)

(58) Field of Classification Search
CPC .... H01M 4/0404; H01M 4/382; H01M 4/661; H01M 2004/0409; H01M 2004/0439; C23C 2/00344
See application file for complete search history.

(56) References Cited

U.S. PATENT DOCUMENTS

| | | | |
|---|---|---|---|
| 2007/0143989 A1* | 6/2007 | Polsonetti | B22F 3/18 29/730 |
| 2019/0144982 A1* | 5/2019 | Veg | C23C 2/004 118/400 |
| 2021/0060638 A1* | 3/2021 | Herle | B22D 11/144 |

* cited by examiner

*Primary Examiner* — Milton I Cano
*Assistant Examiner* — Albert Michael Hilton

(57) ABSTRACT

A method for coating a web with a metal layer includes heating a metal in a container to create molten metal. The metal is selected from a group consisting of lithium (Li), sodium (Na), potassium (K), indium (In), tin (Sn), cadmium (Cd), zinc (Zn), and lead (Pb). The method includes coating at least one surface of a web with a metal layer using the molten metal. The web is made of a material selected from a group consisting of copper (Cu), nickel (Ni), titanium (Ti), stainless steel, polymer, and carbon.

12 Claims, 4 Drawing Sheets

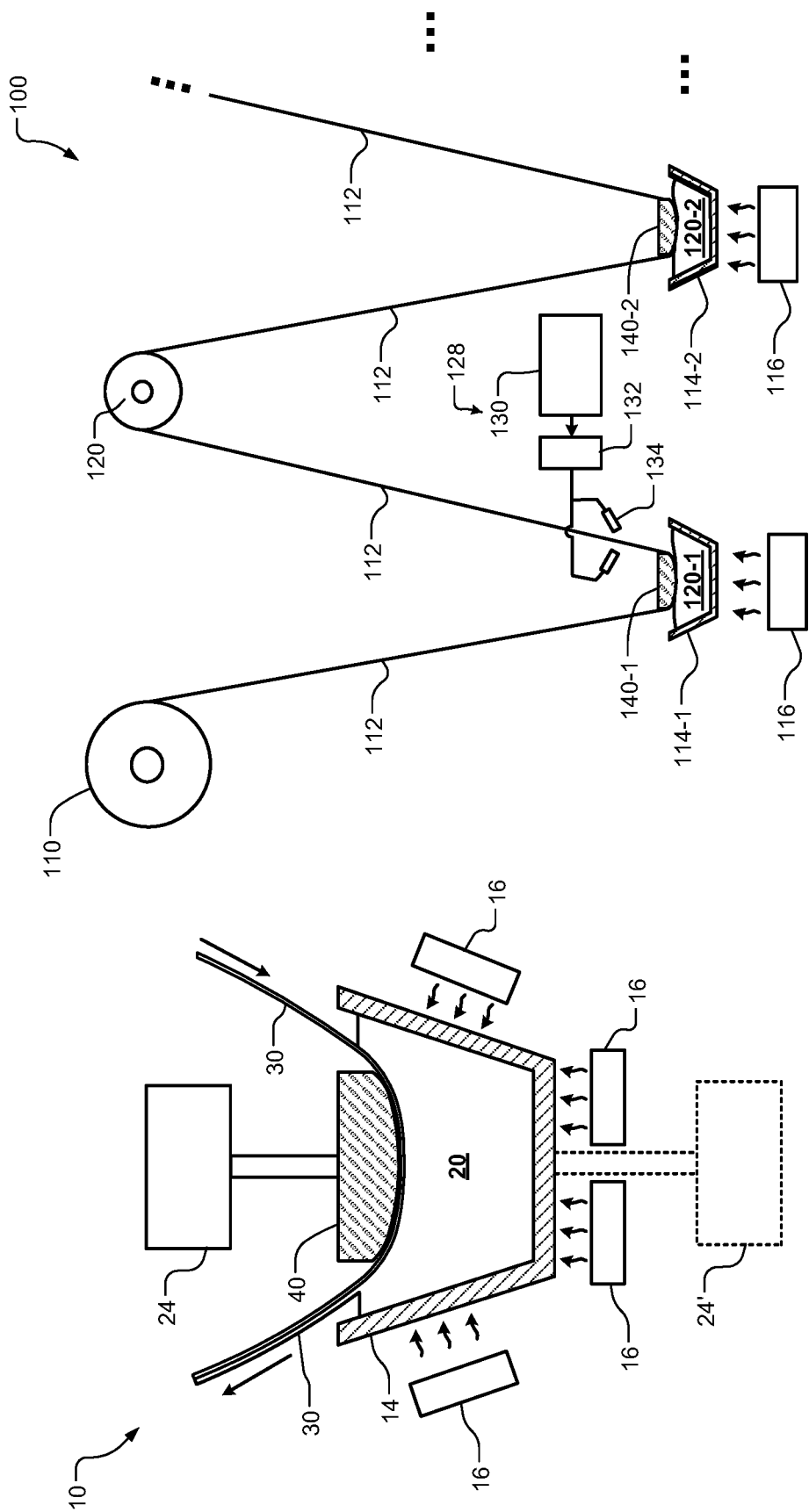

METHOD FOR COATING A METAL LAYER SUCH AS LITHIUM METAL ON A WEB SUCH AS A CURRENT COLLECTOR FOIL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to methods for manufacturing a lithium layer on a current collector foil.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. Manufacturers of EVs are pursuing increased power density to increase the range of the EVs. Lithium-ion battery (LIB) cells are currently used for high power density applications.

SUMMARY

A method for coating a web with a metal layer includes heating a metal in a container to create molten metal. The metal is selected from a group consisting of lithium (Li), sodium (Na), potassium (K), indium (In), tin (Sn), cadmium (Cd), zinc (Zn), and lead (Pb). The method includes coating at least one surface of a web with a metal layer using the molten metal. The web is made of a material selected from a group consisting of copper (Cu), nickel (Ni), titanium (Ti), stainless steel, polymer, and carbon.

In other features, the container is heated to a temperature in a range from a melting temperature of the metal to the melting temperature of the metal plus 200° C. The metal comprises lithium (Li) and the material of the web comprises copper (Cu) foil. The coating is performed without performing prior surface treatment of the web.

In other features, the method includes using a web guiding component to bias one side of the web into the molten metal. The method includes immersing both sides of the web in the molten metal. The method includes feeding the web around a guide roller arranged in the molten metal. The method includes coating the at least one surface of the web with the molten metal by tilting the container. The method includes adjusting a thickness of the metal layer using a thickness adjuster configured to direct gas at the web after coating. The method includes increasing a thickness of the metal layer by coating the web using molten metal in additional containers.

In other features, a thickness of the metal layer is in a range from 1 µm to 80 µm. A thickness of the web is in a range from 1 µm to 100 µm.

A method for coating a web with a Li metal layer includes heating lithium (Li) metal in N containers to create molten Li metal in the N containers. N is an integer greater than zero. A temperature of the N containers is in a range 180° C. to 300° C. The method includes using a roll-to-roll process to coat at least one surface of a web with a Li metal layer using the molten Li metal in the N containers. The web comprises foil made of a material selected from a group consisting of copper (Cu), nickel (Ni), titanium (Ti), and stainless steel. A thickness of the web is in a range from 1 µm to 100 µm. A thickness of the Li metal layer after coating the web with molten Li metal in the N containers is in a range from 1 µm to 50 µm.

In other features, a material of the web comprises copper (Cu) foil. The coating with the molten Li metal is performed without performing prior surface treatment of the web. The method includes using a web guiding component to bias one side of the web into the molten Li metal. The method includes immersing both sides of the web in the molten Li metal. The method includes feeding the web around a guide roller arranged in at least one of the N containers and immersed in the molten Li metal in the at least one of the N containers. The method includes coating both sides of the web with the molten Li metal by tilting at least two of the N containers. The method includes adjusting a thickness of the Li metal layer using a thickness adjuster configured to direct gas at the web after coating in at least one of the N containers. N is greater than one.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example of a method for coating a web such as a current collector foil with a metal layer such as lithium according to the present disclosure;

FIG. 2 is a functional block diagram of an example of a roll-to-roll process for coating a web such as a current collector foil with a metal layer such as lithium according to the present disclosure;

In the drawings, reference numbers may be reused to identify similar and/or identical elements.

DETAILED DESCRIPTION

Figure 3:
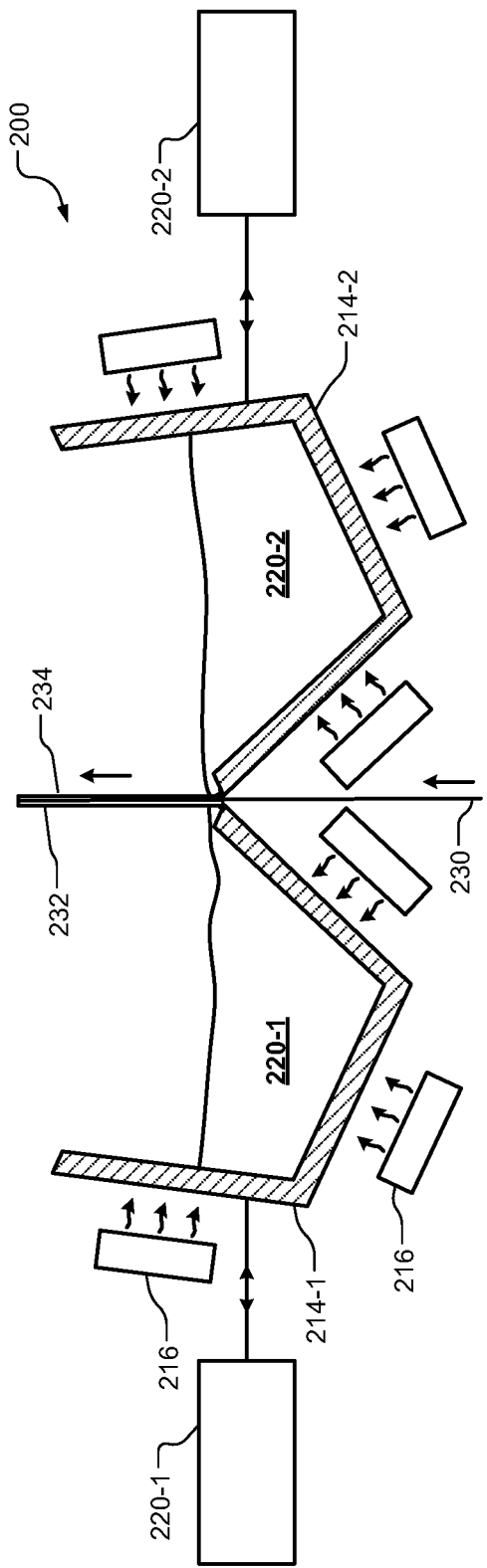
FIG. 3 is a functional block diagram of another example of a method for coating a web such as a current collector foil with a metal layer such as lithium according to the present disclosure.

Battery cells typically include a plurality of unit cells each including cathode and anode electrodes. The cathode electrodes include a cathode current collector and cathode active material arranged on the cathode current collector. The anode electrodes include an anode current collector and anode active material arranged on the anode current collector. Separators are arranged between pairs of the cathode electrodes and the anode electrodes. To maximize the energy density of a lithium (Li) battery cell while ensuring a sufficient battery life cycle, a lithium metal anode may be formed on the anode current collector and used as an extra source of lithium (e.g., for prelithiation).

Prior attempts to wet a metal surface (such as a current collector foil made of copper (Cu), nickel (Ni), titanium (Ti), or stainless steel) using molten Li have been unsuccessful. Generally, a surface treatment is needed to enable one-step fabrication of a Li layer on the current collector using molten Li. For example, the surface treatment may include coating a surface of the current collector foil with a thin layer of a material that reacts or alloys with Li, and/or heating the current collector foil in air to form an oxide layer that is lithiophilic.

The present disclosure relates to systems and methods for manufacturing a lithium metal anode directly on a web such as a current collector foil at high production rates. In some examples, the lithium metal layer (or other low melting temperature metal) has a thickness in a range from 1 µm to 80 µm. In some examples, the lithium metal layer has a thickness in a range from 1 µm to 50 µm. In some examples, the systems and methods described herein form the lithium metal anode directly on the current collector without surface modification or lamination, which reduces manufacturing complication and cost. The anode active material may be arranged on the Li metal anode and current collector. In other examples, surface treatment such as a coating or oxidation is performed.

In some examples, systems and methods according to the present disclosure wet a web such as a current collector foil with molten Li or sodium melt without a prior surface treatment to form a thin Li layer. For example, the surface of the web is dip coated and then the web and Li metal layer are cooled. As can be appreciated, the systems and methods described herein simplify the process for manufacturing a thin Li layer on a metal layer.

Referring now to FIG. 1, molten metal 20 is created in a container 14 by heating metal using one or more heaters 16 to a molten state. In some examples, the one or more heaters 16 heat the molten metal 20 such as Li to a temperature in range between 180° C. to 300° C. An actuator 24 moves a web guiding component 40 in a vertical direction relative to the container 14 to adjust a length of the web that is exposed to the molten metal. In some examples, the web guiding component 40 comprises a block including a smooth surface that allows the web to slide over it. In some examples, an outer contact surface of the web guiding component has an arcuate or semi-elliptical surface to allow changes in a length of exposure of the web with changes in a vertical height of the web guiding component 40. In other examples, the web guiding component comprises one or more rollers arranged in a single horizontal plane or two or more horizontal planes. A web 30 (such as a current collector foil) is supplied by a roller or other source and is fed through the molten metal 20 in the container 14.

In some examples, the web 30 comprises metal foil having a thickness in a range from 1 µm to 100 µm. In some examples, the web 30 is in contact with the molten metal 20 for a predetermined period in a range 1 s to 120 s. After the exposure to the molten metal 20, the web 30 with wetted metal such as Li is moved away from the molten metal 20 for fast cooling of the metal on the web 30.

Contact between the web 30 and the molten metal 20 is adjusted by causing the actuator 24 to move the web guiding component 40 relative to the container 14. Alternately, an actuator 24' may be used to adjust a position of the container 14 relative to the web 30 and the web guiding component 40.

Referring now to FIG. 2, the process described in FIG. 1 can be adapted to roll-to-roll production. A roll 110 supplies a web 112 such as a metal foil to a web guiding component 140-1 adjacent to a first container 114-1 including molten metal 120-1 such as Li. The web guiding component 140-1 biases the web 112 into the molten metal 120-1. The first container 114-1 is heated by one or more heaters 116.

The web 112 is directed by one or more guide rollers 120 and a web guiding component 140-2 adjacent to a second container 114-2 including molten metal 120-1 such as Li. The web guiding component 140-2 biases the web 112 into the molten metal 120-2 in the second container 114-2. The second container 114-2 is heated by one or more heaters 116. The process can be repeated if necessary to increase a thickness of the metal layer.

The final thickness of the metal layer on the web can be controlled by adjusting the length of time that the metal layer and the molten metal are in contact. For example, the contact time can be adjusted by controlling the moving (rolling) speed of the web and/or a distance that the web travels through the molten metal. The final thickness of the metal layer formed on the web may also be adjusted by changes in the temperature of molten metal, the number of containers that the web passes through, and/or a shape of an arcuate or semi-elliptical profile of the web guiding component.

In other examples, the thickness of the metal layer formed on the web is controlled by a thickness adjuster 128 arranged on an outlet side of one or more of the containers. In FIG. 2, the thickness adjuster 128 includes a gas source 130, one or more valves 132, and one or more nozzles 134. The one or more nozzles 134 direct gas at the web 112 including a wet metal layer to adjust a thickness of the metal layer on the web 112.

Referring now to FIG. 3, a double-sided, roll-to-roll process 200 is shown. Molten metal 220-1 is created in a first container 214-1 that is heated by one or more heaters 216. In some examples, the first container 214-1 is mounted on a tilt axis (not shown) to allow tilting of the first container 214-1 from a side of the bottom surface, a middle of the bottom surface or other location. An actuator 220-1 selectively tilts the first container 214-1 to cause molten metal 220-1 to contact one side of a web 230 and to create a metal layer 232 on a web 230. The molten metal coats the surface of the web 230 while the web 230 moves in an upward direction.

Molten metal 220-2 is created in a second container 214-2 that is heated by one or more heaters 216. In some examples, the second container 214-2 is mounted on an axis (not shown) to allow tilting of the second container 214-2 from a side of the bottom surface, a middle of the bottom surface or other location. An actuator 220-2 selectively tilts the second container 214-2 to cause molten metal 220-2 to contact another side of the web 230 and to create a thin metal layer 234 on the web 230. When processing is finished, the first and second containers 214-1 and 214-2 are returned to a level position.

Figure 4:
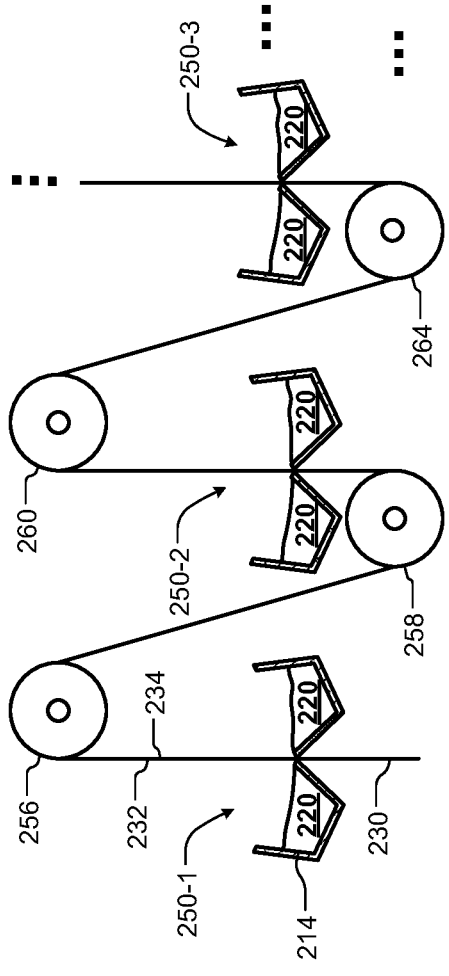
FIG. 4 is a functional block diagram of another example of a roll-to-roll process for a web such as a current collector foil with a metal layer such as lithium according to the present disclosure.

Referring now to FIG. 4, the coating process of FIG. 3 can be repeated one or more times in a roll-to-roll process to increase the thickness of the metal layer on the web. In FIG. 4, the web 230 and the metal layers 232 and 234 move upwardly through a first station 250-1, around a first guide roller 256 and a second guide roller 258, upwardly through a second station 250-2, around a third guide roller 260 and a fourth guide roller 264, and upwardly through a third station 250-2. Each of the stations includes first and second containers 214 that coat opposite sides of the web 230. Additional stations can be used to further increase the thickness of the metal layer if needed and/or to apply another type of coating.

Figure 5:
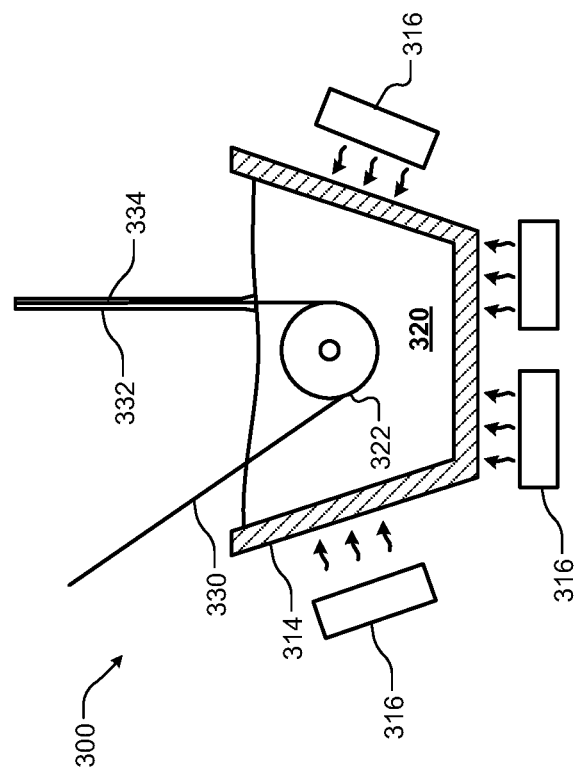
FIG. 5 is a functional block diagram of another example of a method for coating a web such as a current collector foil with a metal layer such as lithium according to the present disclosure.

Referring now to FIG. 5, a process 300 for double-sided coating that fully immerses the web in the molten metal is shown. A container 314 is heated by one or more heaters 316 to create molten metal 320. A web 330 is fed into the molten metal 220 and around a guide roller 322 arranged in the molten metal. Metal layers 332 and 334 are formed on opposite sides of the web 330.

Figure 6:
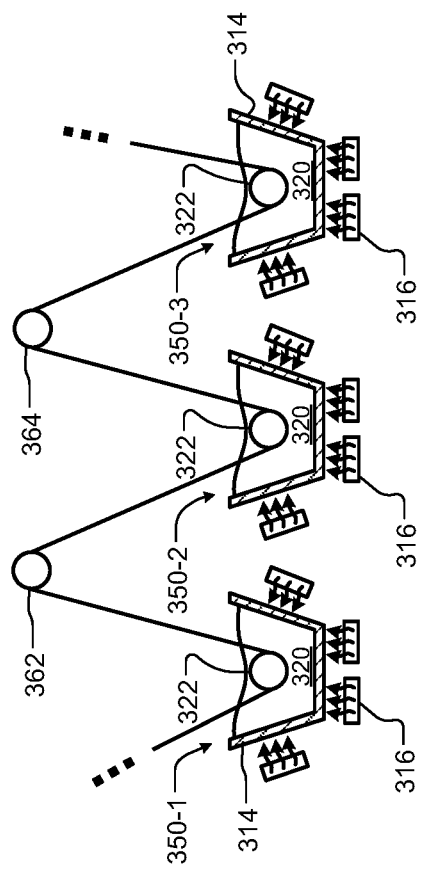
FIG. 6 is a functional block diagram of another example of a roll-to-roll process for a web such as a current collector foil with a metal layer such as lithium according to the present disclosure.
Figure 7:
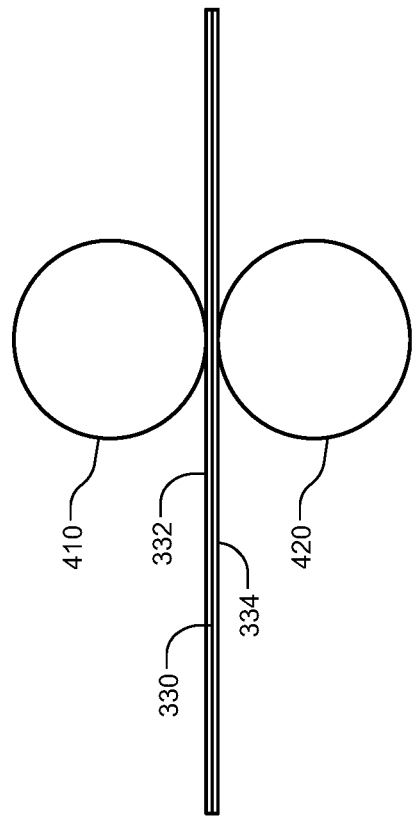
FIG. 7 is a functional block diagram illustrating calendering of the web and the metal layers according to the present disclosure.

Referring now to FIG. 6, the coating process of FIG. 5 can be repeated one or more times in a roll-to-roll process to increase the thickness of the coated metal layer. The web 330 is fed through stations 350-1, 350-2, 350-3, . . . to increase the thickness of the metal layer. More particularly, the web 330 is fed into the molten metal and around the guide roller 322 of the first station 350-1, around a guide roller 362, into the molten metal and around the guide roller 322 of the second station 350-2, around a guide roller 364, into the molten metal and around the guide roller 322 of the third station 350-3, and so on.

After coating the metal layers 332 and 334 on the web 330, calendering or pressing and/or heating can be performed. The web 330 and the metal layers 332 and 334 are fed through rollers 410 and 420 that press and/or heat the web 330 and the metal layers 332 and 334.

In some examples, the web comprises dense foil or porous foil made of a material selected from a group consisting of copper (Cu), nickel (Ni), titanium (Ti), or stainless steel. While the preceding discussion described coating Li metal on the web as an example, the processes described above can also be used to coat other low melting point metals including sodium (Na), potassium (K), indium (In), tin (Sn), cadmium (Cd), zinc (Zn), and lead (Pb) on the web. For these metals, the molten pool temperature is in a temperature range between the melting point of the metal to a temperature 200° C. above the melting temperature.

In the preceding description, the current collector foil made of metal was used as an example. However, the web can also be made of a non-metallic material selected from a group consisting of carbon and polymer.

Figure 8:
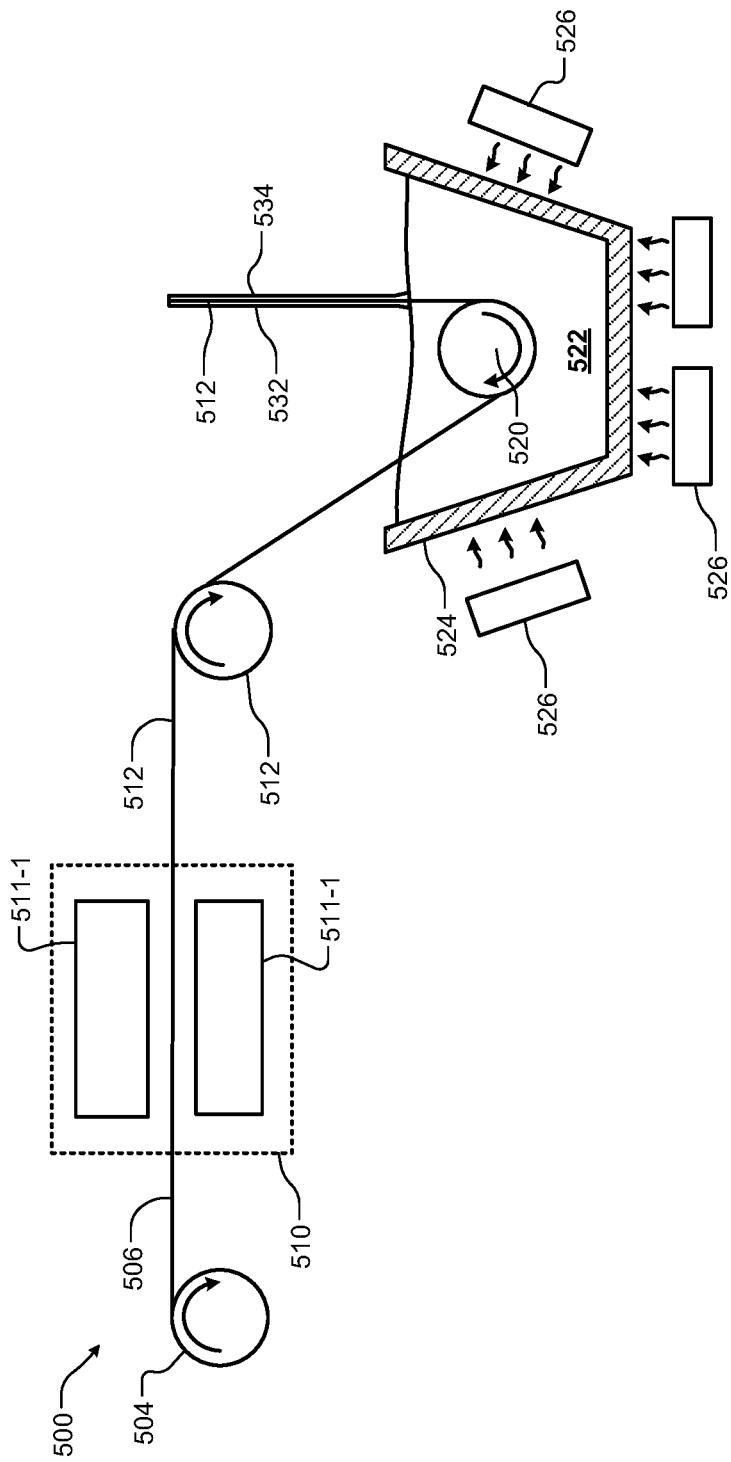
FIG. 8 is a functional block diagram of a method for pre-treating the surface of the web such as a current collector foil prior to coating with the metal layer such as lithium.

Referring now to FIG. 8, surface treatment of the current collector foil can be performed prior to coating with metal. A web 506 is provided by a roll 504. The web 506 passes through a surface treatment device 510 that coats or treats opposite surfaces of the web 506. For example, the surface treatment device 510 may include sprayers and/or heaters 511-1 and 511-2 to coat the surfaces of the web 506 with a coating that enhances wetting and/or to heat the surfaces of the web 506 to form an oxide layer that is lithiophilic.

Molten metal 522 in a container 524 is heated by heaters 526 to a molten state. The surface treated web 512 is guided by a guide roller 514 into the molten metal 522 and around a guide roller 520 located in the molten metal. Metal layers 532 and 534 are coated onto the surface treated web 512. As can be appreciated, additional stations may be used to increase the thickness of the metal layer and/or to add a coating after the metal layers 532 and 534 are added.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for coating a web with a metal layer, comprising:
   heating a metal in a container to create molten metal, wherein the metal is selected from a group consisting of lithium (Li), sodium (Na), potassium (K), indium (In), tin (Sn), cadmium (Cd), zinc (Zn), and lead (Pb); and
   coating at least one surface of a web with a metal layer using the molten metal,
   wherein the web is made of a material selected from a group consisting of copper (Cu), nickel (Ni), titanium (Ti), stainless steel, polymer, and carbon, and
   further coating the at least one surface of the web with the molten metal by tilting the container.

2. The method of claim 1, wherein the container is heated to a temperature in a range from a melting temperature of the metal to the melting temperature of the metal plus 200° C.

3. The method of claim 1, wherein the metal comprises lithium (Li) and the material of the web comprises copper (Cu) foil.

4. The method of claim 1, wherein the coating is performed without performing prior surface treatment of the web.

5. The method of claim 1, further comprising adjusting a thickness of the metal layer using a thickness adjuster configured to direct gas at the web after coating.

6. The method of claim 1, further comprising increasing a thickness of the metal layer by coating the web using molten metal in additional containers.

7. The method of claim 1, wherein:
- a thickness of the metal layer is in a range from 1 µm to 80 µm; and
- a thickness of the web is in a range from 1 µm to 100 µm.

8. A method for coating a web with a Li metal layer, comprising:
- heating lithium (Li) metal in N containers to create molten Li metal in the N containers, wherein N is an integer greater than zero,
- wherein a temperature of the N containers is in a range 180° C. to 300° C.; and
- using a roll-to-roll process to coat at least one surface of a web with a Li metal layer using the molten Li metal in the N containers,
- wherein the web comprises foil made of a material selected from a group consisting of copper (Cu), nickel (Ni), titanium (Ti), and stainless steel,
- wherein a thickness of the web is in a range from 1 µm to 100 µm, and
- wherein a thickness of the Li metal layer after coating the web with molten Li metal in the N containers is in a range from 1 µm to 50 µm, and
- further coating both sides of the web with the molten Li metal by tilting at least two of the N containers.

9. The method of claim 8, wherein material of the web comprises copper (Cu) foil.

10. The method of claim 8, wherein the coating with the molten Li metal is performed without performing prior surface treatment of the web.

11. The method of claim 8, further comprising adjusting a thickness of the Li metal layer using a thickness adjuster configured to direct gas at the web after coating in at least one of the N containers.

12. The method of claim 8, wherein N is greater than one.

* * * * *